(12) United States Patent
Koval et al.

(10) Patent No.: US 12,067,090 B2
(45) Date of Patent: Aug. 20, 2024

(54) SECURITY THROUGH LAYERS IN AN INTELLIGENT ELECTRONIC DEVICE

(71) Applicant: EI Electronics LLC, Westbury, NY (US)

(72) Inventors: Luna A. Koval, Commack, NY (US); Hai Zhu, Hauppauge, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 0 days.

(21) Appl. No.: 18/452,826

(22) Filed: Aug. 21, 2023

(65) Prior Publication Data
US 2023/0401293 A1    Dec. 14, 2023

Related U.S. Application Data

(63) Continuation of application No. 16/419,205, filed on May 22, 2019, now Pat. No. 11,734,396, which is a
(Continued)

(51) Int. Cl.
*G06F 21/12* (2013.01)
*G01D 4/00* (2006.01)
(Continued)

(52) U.S. Cl.
CPC .............. *G06F 21/12* (2013.01); *G01D 4/004* (2013.01); *G06F 21/14* (2013.01); *G06Q 10/06* (2013.01);
(Continued)

(58) Field of Classification Search
CPC .......... G06F 21/12; G06F 21/14; G06F 21/53; G06F 21/74; H04L 67/12; G06Q 50/06
See application file for complete search history.

(56) References Cited

U.S. PATENT DOCUMENTS 2,883,255 A    4/1959   Anderson
2,987,704 A    6/1961   Gimpel et al.
(Continued)

FOREIGN PATENT DOCUMENTS

CN    101799681 A    8/2010
WO    2009/044369 A2    4/2009

OTHER PUBLICATIONS

"7700 ION: 3-Phase Power Meter, Analyzer and Controller: Power Measurement, specification," ION Technology, revision date Dec. 8, 1998. (10 pages).
(Continued)

*Primary Examiner* — Chau Le
(74) *Attorney, Agent, or Firm* — Robinson + Cole LLP

(57) ABSTRACT

The present disclosure provides for improving security in a meter or an intelligent electronic device (IED) through the use of a security key which is unique to each meter or IED. Such a key may be used to prevent password reuse among multiple meters. Such a key may also be used to encrypt critical components of the software, such that only when running on the correct meter can the components of the software be decrypted. Such a key may also be used to uniquely identify the device in a larger data collection and management system. The security key can also be used to prevent the direct copying of meters. The present disclosure also provides for a meter or IED that stores functional software separately from core software.

18 Claims, 6 Drawing Sheets

Related U.S. Application Data continuation of application No. 14/742,061, filed on Jun. 17, 2015, now Pat. No. 10,303,860.

(60) Provisional application No. 62/013,234, filed on Jun. 17, 2014.

(51) Int. Cl.

| | | |
|---|---|---|
| *G06F 21/14* | (2013.01) | |
| *G06Q 10/06* | (2023.01) | |
| *G06Q 50/06* | (2012.01) | |
| *H04L 9/40* | (2022.01) | |
| *H04L 67/06* | (2022.01) | |
| *H04L 67/12* | (2022.01) | |
| *G01R 1/02* | (2006.01) | |
| *G01R 19/25* | (2006.01) | |
| *G01R 22/06* | (2006.01) | |
| *G06F 21/10* | (2013.01) | |

(52) U.S. Cl.
CPC ......... *G06Q 50/06* (2013.01); *H04L 63/0435* (2013.01); *H04L 67/06* (2013.01); *H04L 67/12* (2013.01); *G01R 1/025* (2013.01); *G01R 19/2513* (2013.01); *G01R 22/063* (2013.01); *G06F 21/1011* (2023.08); *Y02B 90/20* (2013.01); *Y04S 20/30* (2013.01); *Y04S 40/18* (2018.05); *Y04S 40/20* (2013.01)

(56) References Cited

U.S. PATENT DOCUMENTS

| | | | |
|---|---|---|---|
| 3,142,820 A | 7/1964 | Daniels | |
| 3,453,540 A | 7/1969 | Dusheck, Jr. | |
| 3,824,441 A | 7/1974 | Heyman et al. | |
| 4,246,623 A | 1/1981 | Sun | |
| 4,466,071 A | 8/1984 | Russell, Jr. | |
| 4,884,021 A | 11/1989 | Hammond et al. | |
| 4,996,646 A | 2/1991 | Farrington | |
| 5,041,229 A | 5/1991 | Mofachern | |
| 5,166,887 A | 11/1992 | Farrington et al. | |
| 5,170,360 A | 12/1992 | Porter et al. | |
| 5,185,705 A | 2/1993 | Farrington | |
| 5,212,441 A | 5/1993 | McEachern et al. | |
| 5,224,054 A | 6/1993 | Wallis | |
| 5,233,538 A | 8/1993 | Wallis | |
| 5,237,511 A | 8/1993 | Caird et al. | |
| 5,298,854 A | 3/1994 | McEachern et al. | |
| 5,298,855 A | 3/1994 | McEachern et al. | |
| 5,298,856 A | 3/1994 | McEachern et al. | |
| 5,298,859 A | 3/1994 | McEachern et al. | |
| 5,298,885 A | 3/1994 | McEachern et al. | |
| 5,298,888 A | 3/1994 | McEachern et al. | |
| 5,300,924 A | 4/1994 | McEachern et al. | |
| 5,301,122 A | 4/1994 | Halpern | |
| 5,302,890 A | 4/1994 | McEachern et al. | |
| 5,307,009 A | 4/1994 | McEachern et al. | |
| 5,315,527 A | 5/1994 | Beckwith | |
| 5,347,464 A | 9/1994 | McEachern et al. | |
| 5,544,064 A | 8/1996 | Beckwith | |
| 5,559,719 A | 9/1996 | Johnson et al. | |
| 5,574,654 A | 11/1996 | Bingham et al. | |
| 5,581,173 A | 12/1996 | Yalla et al. | |
| 5,706,204 A | 1/1998 | Cox et al. | |
| 5,764,523 A | 6/1998 | Yoshinaga et al. | |
| 5,774,366 A | 6/1998 | Beckwith | |
| 5,801,643 A | 9/1998 | Williams et al. | |
| 5,819,203 A | 10/1998 | Moore et al. | |
| 5,822,165 A | 10/1998 | Moran | |
| 5,832,210 A | 11/1998 | Akiyama et al. | |
| 5,874,903 A | 2/1999 | Shuey et al. | |
| 5,898,387 A | 4/1999 | Davis et al. | |
| 5,899,960 A | 5/1999 | Moore et al. | |
| 5,986,574 A | 11/1999 | Colton | |
| 6,018,690 A | 1/2000 | Saito et al. | |
| 6,028,857 A | 2/2000 | Poor | |
| 6,038,516 A | 3/2000 | Alexander et al. | |
| 6,073,169 A | 6/2000 | Shuey et al. | |
| 6,098,175 A | 8/2000 | Lee | |
| 6,100,817 A | 8/2000 | Mason, Jr. et al. | |
| 6,151,653 A | 11/2000 | Lin et al. | |
| 6,157,329 A | 12/2000 | Lee et al. | |
| 6,167,329 A | 12/2000 | Engel et al. | |
| 6,195,614 B1 | 2/2001 | Kochan | |
| 6,279,037 B1 | 8/2001 | Tams et al. | |
| 6,289,267 B1 | 9/2001 | Alexander et al. | |
| 6,343,299 B1 | 1/2002 | Huang et al. | |
| 6,396,839 B1 | 5/2002 | Ardalan et al. | |
| 6,405,128 B1 | 6/2002 | Bechtolsheim et al. | |
| 6,437,692 B1 | 8/2002 | Petite et al. | |
| 6,493,644 B1 | 12/2002 | Jonker et al. | |
| 6,496,511 B1 | 12/2002 | Wang et al. | |
| 6,519,537 B1 | 2/2003 | Yang | |
| 6,528,957 B1 | 3/2003 | Luchaco | |
| 6,564,332 B1 | 5/2003 | Nguyen et al. | |
| 6,565,608 B1 | 5/2003 | Fein et al. | |
| 6,615,147 B1 | 9/2003 | Jonker et al. | |
| 6,636,030 B1 | 10/2003 | Rose et al. | |
| 6,657,552 B2 | 12/2003 | Belski et al. | |
| 6,671,654 B1 | 12/2003 | Forth et al. | |
| 6,671,802 B1 | 12/2003 | Ott | |
| 6,717,394 B2 | 4/2004 | Elms | |
| 6,735,535 B1 | 5/2004 | Kagan et al. | |
| 6,751,563 B2 | 6/2004 | Spanier et al. | |
| 6,836,737 B2 | 12/2004 | Petite et al. | |
| 6,842,707 B2 | 1/2005 | Raichle et al. | |
| 6,900,738 B2 | 5/2005 | Crichlow | |
| 6,957,158 B1 | 10/2005 | Hancock et al. | |
| 6,972,364 B2 | 12/2005 | Diedrichsen | |
| 6,985,087 B2 | 1/2006 | Soliman | |
| 7,006,934 B2 | 2/2006 | Jonker et al. | |
| 7,010,438 B2 | 3/2006 | Hancock et al. | |
| 7,043,459 B2 | 5/2006 | Peevey | |
| 7,049,975 B2 | 5/2006 | Vanderah et al. | |
| 7,050,808 B2 | 5/2006 | Janusz et al. | |
| 7,072,779 B2 | 7/2006 | Hancock et al. | |
| 7,085,824 B2 | 8/2006 | Forth et al. | |
| 7,126,493 B2 | 10/2006 | Junker et al. | |
| 7,129,848 B2 | 10/2006 | Milliot et al. | |
| 7,203,319 B2 | 4/2007 | Ben-Zur et al. | |
| 7,243,050 B2 | 7/2007 | Armstrong | |
| 7,249,265 B2 | 7/2007 | von Carolsfeld et al. | |
| 7,299,308 B2 | 11/2007 | Kondo et al. | |
| 7,304,586 B2 | 12/2007 | Wang et al. | |
| 7,337,081 B1 | 2/2008 | Kagan | |
| 7,342,507 B2 | 3/2008 | Jonker et al. | |
| 7,436,687 B2 | 10/2008 | Patel | |
| 7,444,454 B2 | 10/2008 | Yancey et al. | |
| 7,511,468 B2 | 3/2009 | McEachern et al. | |
| 7,514,907 B2 | 4/2009 | Rajda et al. | |
| 7,616,656 B2 | 11/2009 | Wang et al. | |
| 7,739,728 B1 | 6/2010 | Koehler, Jr. et al. | |
| 7,813,822 B1 | 10/2010 | Hoffberg | |
| 7,899,630 B2 | 3/2011 | Kagan | |
| 7,916,015 B1 | 3/2011 | Evancich et al. | |
| 7,916,060 B2 | 3/2011 | Zhu et al. | |
| 7,921,199 B1 | 4/2011 | Shirriff et al. | |
| 7,961,736 B2 | 6/2011 | Ayyagari | |
| 7,962,298 B2 | 6/2011 | Przydatek et al. | |
| 7,999,696 B2 | 8/2011 | Wang et al. | |
| 8,019,836 B2 | 9/2011 | Elliott et al. | |
| 8,037,173 B2 * | 10/2011 | Tuckey | G05B 23/0224 709/224 |
| 8,078,418 B2 | 12/2011 | Banhegyesi et al. | |
| 8,160,824 B2 | 4/2012 | Spanier et al. | |
| 8,190,381 B2 | 5/2012 | Spanier et al. | |
| 8,335,936 B2 | 12/2012 | Jonsson et al. | |
| 8,402,267 B1 | 3/2013 | Graham et al. | |
| 8,599,036 B2 | 12/2013 | Wang et al. | |
| 8,635,036 B2 | 1/2014 | Pamulaparthy et al. | |
| 8,812,979 B2 | 8/2014 | Khanke et al. | |
| 8,933,815 B2 | 1/2015 | Kagan et al. | |
| 9,094,227 B2 | 7/2015 | Park | |

(56) References Cited

U.S. PATENT DOCUMENTS

| | | |
|---|---|---|
| 2002/0024453 A1 | 2/2002 | Maeda |
| 2002/0032535 A1 | 3/2002 | Alexander et al. |
| 2002/0048269 A1 | 4/2002 | Hong et al. |
| 2002/0052972 A1 | 5/2002 | Yim |
| 2002/0065872 A1 | 5/2002 | Genske et al. |
| 2002/0073211 A1 | 6/2002 | Lin et al. |
| 2002/0105435 A1 | 8/2002 | Yee et al. |
| 2002/0120723 A1 | 8/2002 | Forth et al. |
| 2002/0129342 A1 | 9/2002 | Kil et al. |
| 2002/0169570 A1 | 11/2002 | Spanier et al. |
| 2002/0174223 A1 | 11/2002 | Childers et al. |
| 2002/0188706 A1 | 12/2002 | Richards et al. |
| 2003/0005130 A1 | 1/2003 | Cheng |
| 2003/0014200 A1 | 1/2003 | Jonker et al. |
| 2003/0065757 A1 | 4/2003 | Mentze et al. |
| 2003/0084280 A1 | 5/2003 | Bryan et al. |
| 2003/0093429 A1 | 5/2003 | Nishikawa et al. |
| 2003/0110380 A1 | 6/2003 | Carolsfeld et al. |
| 2003/0178982 A1 | 9/2003 | Elms |
| 2003/0179714 A1 | 9/2003 | Gilgenbach et al. |
| 2003/0187550 A1 | 10/2003 | Wilson et al. |
| 2003/0200285 A1 | 10/2003 | Hansen et al. |
| 2003/0204756 A1 | 10/2003 | Ransom et al. |
| 2003/0226058 A1 | 12/2003 | Miller et al. |
| 2004/0078474 A1 | 4/2004 | Ramaswamy |
| 2004/0107025 A1 | 6/2004 | Ransom et al. |
| 2004/0128260 A1 | 7/2004 | Amedure et al. |
| 2004/0138834 A1 | 7/2004 | Blackett et al. |
| 2004/0162642 A1 | 8/2004 | Gasper et al. |
| 2004/0170181 A1 | 9/2004 | Bogdon et al. |
| 2004/0172207 A1 | 9/2004 | Hancock et al. |
| 2004/0177062 A1 | 9/2004 | Urquhart et al. |
| 2004/0187028 A1 | 9/2004 | Perkins et al. |
| 2004/0193329 A1* | 9/2004 | Ransom ............... H04L 63/20 700/286 |
| 2004/0208182 A1 | 10/2004 | Boles et al. |
| 2004/0243735 A1 | 12/2004 | Rosenbloom et al. |
| 2004/0250059 A1 | 12/2004 | Ramelson et al. |
| 2005/0027464 A1 | 2/2005 | Jonker et al. |
| 2005/0033956 A1 | 2/2005 | Krempl |
| 2005/0060110 A1 | 3/2005 | Jones et al. |
| 2005/0093571 A1 | 5/2005 | Suaris et al. |
| 2005/0138421 A1 | 6/2005 | Fedronic et al. |
| 2005/0138432 A1 | 6/2005 | Ransom et al. |
| 2005/0169309 A1 | 8/2005 | Tripathi et al. |
| 2005/0183128 A1 | 8/2005 | Assayag et al. |
| 2005/0187725 A1 | 8/2005 | Cox |
| 2005/0240540 A1 | 10/2005 | Borleske et al. |
| 2005/0273280 A1 | 12/2005 | Cox |
| 2005/0273281 A1 | 12/2005 | Wall et al. |
| 2006/0020788 A1 | 1/2006 | Han et al. |
| 2006/0047787 A1 | 3/2006 | Agarwal et al. |
| 2006/0052958 A1 | 3/2006 | Hancock et al. |
| 2006/0066456 A1 | 3/2006 | Jonker et al. |
| 2006/0066903 A1 | 3/2006 | Shiimori |
| 2006/0083260 A1 | 4/2006 | Wang et al. |
| 2006/0085419 A1 | 4/2006 | Rosen |
| 2006/0145890 A1 | 7/2006 | Junker et al. |
| 2006/0155422 A1 | 7/2006 | Uy et al. |
| 2006/0161360 A1 | 7/2006 | Yao et al. |
| 2006/0161400 A1 | 7/2006 | Kagan |
| 2006/0200599 A1 | 9/2006 | Manchester et al. |
| 2006/0206433 A1 | 9/2006 | Scoggins |
| 2006/0267560 A1 | 11/2006 | Rajda et al. |
| 2006/0274899 A1 | 12/2006 | Zhu et al. |
| 2007/0047735 A1 | 3/2007 | Celli et al. |
| 2007/0058634 A1 | 3/2007 | Gupta et al. |
| 2007/0061786 A1 | 3/2007 | Zhou et al. |
| 2007/0067119 A1 | 3/2007 | Loewen et al. |
| 2007/0067121 A1 | 3/2007 | Przydatek et al. |
| 2007/0096765 A1 | 5/2007 | Kagan |
| 2007/0096942 A1 | 5/2007 | Kagan et al. |
| 2007/0114987 A1 | 5/2007 | Kagan |
| 2007/0152058 A1 | 7/2007 | Yeakley et al. |
| 2007/0186111 A1 | 8/2007 | Durand |
| 2007/0263643 A1 | 11/2007 | Wadhawan |
| 2007/0266004 A1 | 11/2007 | Wall et al. |
| 2008/0028395 A1 | 1/2008 | Motta et al. |
| 2008/0052384 A1 | 2/2008 | Marl et al. |
| 2008/0071482 A1 | 3/2008 | Zweigle et al. |
| 2008/0086222 A1 | 4/2008 | Kagan |
| 2008/0103631 A1 | 5/2008 | Koliwad et al. |
| 2008/0130639 A1 | 6/2008 | Costa-Requena et al. |
| 2008/0147334 A1 | 6/2008 | Kagan |
| 2008/0172192 A1 | 7/2008 | Banhegyesi |
| 2008/0187116 A1 | 8/2008 | Reeves et al. |
| 2008/0195562 A1 | 8/2008 | Worth et al. |
| 2008/0195794 A1 | 8/2008 | Banker |
| 2008/0201723 A1 | 8/2008 | Bottaro et al. |
| 2008/0215264 A1 | 9/2008 | Spanier et al. |
| 2008/0228830 A1 | 9/2008 | Hawtin |
| 2008/0234957 A1 | 9/2008 | Banhegyesi et al. |
| 2008/0238406 A1 | 10/2008 | Banhegyesi |
| 2008/0238713 A1 | 10/2008 | Banhegyesi et al. |
| 2008/0243404 A1 | 10/2008 | Banhegyesi |
| 2009/0012728 A1 | 1/2009 | Spanier et al. |
| 2009/0055912 A1 | 2/2009 | Choi et al. |
| 2009/0070168 A1 | 3/2009 | Thompson et al. |
| 2009/0082879 A1 | 3/2009 | Dooley et al. |
| 2009/0094317 A1 | 4/2009 | Venkitaraman |
| 2009/0096654 A1 | 4/2009 | Zhu et al. |
| 2009/0115626 A1 | 5/2009 | Vaswani et al. |
| 2009/0228224 A1 | 9/2009 | Spanier et al. |
| 2009/0235075 A1 | 9/2009 | Cho et al. |
| 2009/0235090 A1 | 9/2009 | Chang |
| 2009/0276102 A1 | 11/2009 | Smith et al. |
| 2009/0292894 A1 | 11/2009 | Henry et al. |
| 2010/0054276 A1 | 3/2010 | Wang et al. |
| 2010/0057387 A1 | 3/2010 | Kagan et al. |
| 2010/0121996 A1 | 5/2010 | Schmidt et al. |
| 2010/0169876 A1 | 7/2010 | Mann |
| 2010/0238003 A1 | 9/2010 | Chan et al. |
| 2010/0299441 A1 | 11/2010 | Hughes et al. |
| 2010/0324845 A1 | 12/2010 | Spanier et al. |
| 2011/0004350 A1 | 1/2011 | Cheifetz et al. |
| 2011/0004426 A1 | 1/2011 | Wright et al. |
| 2011/0015961 A1 | 1/2011 | Chan |
| 2011/0029461 A1 | 2/2011 | Hardin, Jr. |
| 2011/0040809 A1 | 2/2011 | Spanier et al. |
| 2011/0069709 A1 | 3/2011 | Morris et al. |
| 2011/0106589 A1 | 5/2011 | Blomberg et al. |
| 2011/0107357 A1 | 5/2011 | Cullimore |
| 2011/0178651 A1 | 7/2011 | Choi et al. |
| 2012/0041696 A1 | 2/2012 | Sanderford, Jr. et al. |
| 2012/0059932 A1 | 3/2012 | Messer et al. |
| 2012/0078547 A1* | 3/2012 | Murdoch ............... G01D 4/004 702/62 |
| 2012/0079471 A1 | 3/2012 | Vidal et al. |
| 2012/0099478 A1 | 4/2012 | Fu et al. |
| 2012/0126995 A1 | 5/2012 | Sobotka et al. |
| 2012/0209057 A1 | 8/2012 | Siess et al. |
| 2012/0299744 A1 | 11/2012 | Sfaelos |
| 2013/0031201 A1* | 1/2013 | Kagan ................... G01D 4/004 709/213 |
| 2013/0055389 A1 | 2/2013 | Alvarez et al. |
| 2013/0151849 A1 | 6/2013 | Graham et al. |
| 2013/0158918 A1 | 6/2013 | Spanier et al. |
| 2013/0318627 A1 | 11/2013 | Lundkvist et al. |
| 2014/0025321 A1* | 1/2014 | Spanier ................ G01R 21/133 702/62 |
| 2014/0325679 A1* | 10/2014 | Heo ...................... G06F 21/606 726/28 |
| 2015/0089061 A1 | 3/2015 | Li et al. |
| 2015/0143108 A1 | 5/2015 | Demeter et al. |
| 2015/0317151 A1 | 11/2015 | Falcy et al. |
| 2015/0324896 A1 | 11/2015 | Marson et al. |
| 2017/0063566 A1* | 3/2017 | Seminario ............. H04L 67/12 |

OTHER PUBLICATIONS

Allard et al., "Jini meets UPnP: an architecture for Jini/UPnP interoperability," Proceedings of the 2003 Symposium on Applica-

(56) References Cited

OTHER PUBLICATIONS tions and the Internet, Institute of Electrical and Electronics Engineers, 2003. (8 pages).
Braden, R., "Requirements for Internet Hosts—Application and Support," Request for Comments: 1123, Oct. 1989. (97 pages).
Chima, Chikodi, "How Social Media Will Make the smart Energy Grid More Efficient," mashable.com, Feb. 8, 2011. (4 pages).
Communicator EXT 3.0: User Manual Revision 1.32, Electro Industries/Gauge Tech, Aug. 27, 2007. (558 pages).
Deutsch et al., "How to Use Anonymous FTP," RFC1635, May 1994. (14 pages).
Duncan et al., "Protection, metering, monitoring, and control of medium-voltage power systems," IEEE Transactions on Industry Applications, Jan./Feb. 2004, vol. 40, No. 1, pp. 33-40.
"7500 ION 7600 ION: High Visibility Energy & Power Quality Compliance Meters, Power Measurement, specification," ION Technology, revision date Nov. 30, 2000. (8 pages).
Gonzales et al., "Passive Scanning in Modbus Networks," IFIP International Federation for Information Processing, 2008, vol. 253, Critical Infrastructure Protection, pp. 175-187.
Hubbert, "What is flat file?", Whatls.com, http://searchsqlserver.techtarget.com/definition/flat-file, Jul. 2006. (1 page).
"HW Virtual Serial Port," HW server, http://www.trcontrolsolutions.com/pdfs/hw_vsp_v104_en.pdf, Jul. 2003. (4 pages).
"Electromagnetic compatibility (EMC) Part 4: Testing and measuring techniques, Section 15: Flickermeter—Functional and design specifications (IEC 61000-4-15)," European Committee for Electrotechnical Standardization, Apr. 1998. (25 pages).
Futura+Series, "Advanced Power Monitoring and Analysis for the 21st Century," Electro Industries/Gauge Tech, Specification, Apr. 13, 2000. (8 pages).
"7500 ION: High Visibility 3-Phase Energy & Power Quality Meter, Power Measurement, specification," ION Technology, revision date Mar. 21, 2000. (8 pages).
"ION7550/ION7650 PowerLogic power-monitoring units: Technical data sheets," Schneider Electric, 2006. (12 pages).
"Using DNS Servers with DHCP," Microsoft TechNet, Jan. 21, 2005, accessed from https://technet.microsoft.com/en-us/library/cc787034 on Jun. 9, 2015. (4 pages).
"Nexus 1250: Installation and Operation Manual Revision 1.20," Electro Industries/Gauge Tech, Nov. 8, 2000. (50 pages).
"Nexus 1250: Precision Power Meter & Data Acquisition Node," Accumeasure Technology, Electro Industries/Gauge Tech, specification, Nov. 1999. (16 pages).
"Nexus 1250: Performance Power Meter & Data Acquisition Node," Electro Industries/Gauge Tech, specification, Dec. 14, 2000. (8 pages).
Postel et al., "File Transfer Protocol (FTP)", RFC 959, Oct. 1985. (66 pages).
"PowerLogic Series 4000 Circuit Monitors," Schneider Electric, Document # 3020HO0601, Jan. 2006. (4 pages).
Speirs, Ryan, "What is binary file?", WhatIs.com, http://whatis.techtarget.com/definition/binary-file, Apr. 2005. (1 page).
"UPnP Device Architecture 1.0," UPnP Forum, revised Apr. 24, 2008. (80 pages).
"User's Installation & Operation and User's Programming Manual," The Futura Series, Electro Industries/Gaugetech, 1995. (34 pages).
White, Russ, "Working with IP addresses," The Internet Protocol Journal, Cisco Systems, Inc., vol. 9, No. 1, 1992-2006, http://web.archive.org/web/20060508172602/http://www.cisco.com/web/about/ac123/ac147/archived_issues/ipj_9-1/ip_addresses.tml, May 8, 2008. (8 pages).
"Burst Mode (computing)," Wikipedia, https://web.archive.org/web/20081018044345/http://en.wikipedia.org/wiki/Burst_mode_(computing), Oct. 18, 2008. (1 page).
"File Transfer Protocol," Wikipedia, https://web.archive.org/web/20051216071210/http:en.wikipedia.org/wiki/File_Transfer_Protocol, Dec. 16, 2005. (9 pages).
"Universal Plug and Play," Wikipedia, https://web.archive.org/web/2001014015536/http://en.wikipedia.org/wiki/Universal_Plug_and_Play, Oct. 14, 2007. (14 pages).
Wils et al., "Device discovery via residential gateways," IEEE Transactions on Consumer Electronics, Aug. 2002, vol. 48, No. 3, pp. 478-483.
Zeinalipour-Yazti et al., "MicroHash: An Efficient Index Structure for Flash-Based Sensor Devices," Proceedings of the 4th Conference on USENIX Conference on File and Storage Technologies, Dec. 2005, vol. 4. (14 pages).
Zhang et al., "On supporting containment queries in relational database management systems," ACM SIGMOD Record, 2001, vol. 30. No. 2, pp. 425-436.
Codingfreak, "iptables—Rate-limit incoming connections," https://web.archive.org/web/20100426123449/http://codingfreak.blogspot.com/2010/01/iptables-rate-limitincoming.htm, Apr. 26, 2010. (3 pages).
Crockford, Douglas, "What jsmin Does," https://web.archive.org/web/20030621080211/http://www.crockford.com/javascript/jsmin.html, Oct. 28, 2002. (2 pages).

\* cited by examiner

SECURITY THROUGH LAYERS IN AN INTELLIGENT ELECTRONIC DEVICE

PRIORITY

This application is a continuation application of U.S. patent application Ser. No. 16/419,205, filed May 22, 2019, entitled "SECURITY THROUGH LAYERS IN AN INTELLIGENT ELECTRONIC DEVICE", which is a continuation application of U.S. patent application Ser. No. 14/742,061 filed on Jun. 17, 2015, entitled "SECURITY THROUGH LAYERS IN AN INTELLIGENT ELECTRONIC DEVICE", which claims priority to U.S. Provisional Patent Application No. 62/013,234, filed Jun. 17, 2014, the contents of all of which are hereby incorporated by reference in their entireties.

CROSS REFERENCE TO RELATED APPLICATIONS

This application is related to U.S. patent application Ser. No. 13/831,708 filed on Mar. 15, 2013, entitled "SYSTEMS AND METHODS FOR COLLECTING, ANALYZING, BILLING, AND REPORTING DATA FROM INTELLIGENT ELECTRONIC DEVICES", which a continuation-in-part application of U.S. patent application Ser. No. 13/644,877 filed on Oct. 4, 2012, entitled "INTELLIGENT ELECTRONIC DEVICE COMMUNICATION SOLUTIONS FOR NETWORK TOPOLOGIES", which claims priority to U.S. Provisional Patent Application No. 61/542,935, filed Oct. 4, 2011; to U.S. patent application Ser. No. 13/799,832, filed Mar. 13, 2013, entitled "SYSTEMS AND METHODS FOR COLLECTING, ANALYZING, BILLING, AND REPORTING DATA FROM INTELLIGENT ELECTRONIC DEVICES"; and to U.S. patent application Ser. No. 13/836,671, filed Mar. 15, 2013, entitled "SYSTEMS AND METHODS FOR PROCESSING METER INFORMATION IN A NETWORK OF INTELLIGENT ELECTRONIC DEVICES", the contents of all of which are hereby incorporated by reference in their entireties.

BACKGROUND

Field. The present disclosure relates generally to isolating secure functions of a meter or an intelligent electronic device (IED) by not exposing direct access to those functions on externally facing interfaces.

Description of the Related Art. Security is becoming a major issue with meters, also known as intelligent electronic devices (IEDs), especially as the interfaces to communicate with them transitions from being primarily serial to over networks. Since meters have been traditionally kept internal to networks, the security applied to them is often minimal, especially when compared to the security found in most modern servers. However, as attacks become more sophisticated and meters become more globally accessible, these old paradigms are no longer sufficient.

Additionally, an unfortunate side effect of the commercialization of a meter is reverse engineering and copying of both hardware and the software that runs on it. While methods such as locking the software inside of the chip, so that it cannot be easily read back out, can help prevent this, it only easily works with small code bases, which limit the features and power of the software.

SUMMARY

The present disclosure provides for improving security in a meter or an intelligent electronic device (IED) through the use of a security key which is unique to each meter or IED. Such a key may be used to prevent password reuse among multiple meters. Such a key may also be used to encrypt critical components of the software, such that only when running on the correct meter can the components of the software be decrypted. Such a key may also be used to uniquely identify the device in a larger data collection and management system.

Another embodiment to improving security is to functionally isolate the external facing functionality, such as a web server or Modbus server, from the internal secure functionality, such as changing the programmable settings or accessing meter readings values.

One embodiment to preventing the direct copying of meters is to encrypt the software uniquely to each meter, such that only a meter whose hardware provides the correct security key can run the software.

Another embodiment to preventing the direct copying of meters is to store the functional software separately from the core software. In such a case, the core software is defined as the kernel, or the software which is required to run the other software, e.g., an operating system such as Linux™. The functional software is defined as the software component which provides a specific metering function, such as a web server, Modbus server, data acquisition, or logging.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Figure 1:
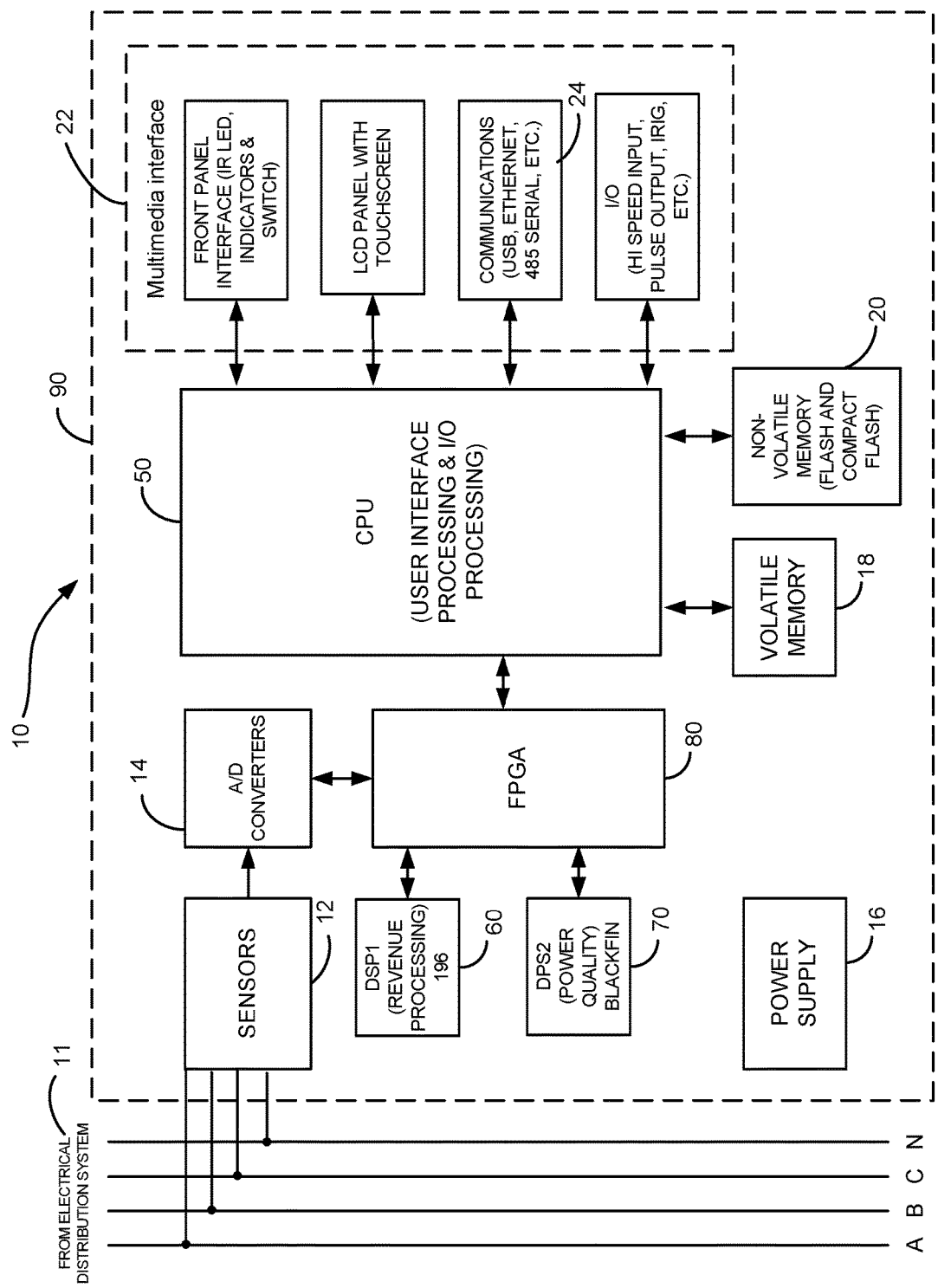
FIG. 1 is a block diagram of an intelligent electronic device (IED), according to an embodiment of the present disclosure.

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

The present disclosure provides for improving security in a meter or an intelligent electronic device (IED) through the use of a security key which is unique to each meter or IED. Such a key may be used to prevent password reuse among multiple meters. Such a key may also be used to encrypt critical components of the software, such that only when running on the correct meter can the components of the software be decrypted. Such a key may also be used to uniquely identify the device in a larger data collection and management system.

FIG. 1 is a block diagram of an intelligent electronic device (IED) 10 for monitoring and determining power usage and power quality for any metered point within a power distribution system and for providing a data transfer system for faster and more accurate processing of revenue and waveform analysis.

The IED 10 of FIG. 1 includes a plurality of sensors 12 coupled to various phases A, B, C and neutral N of an electrical distribution system 11, a plurality of analog-to-digital (A/D) converters 14, including inputs coupled to the sensor 12 outputs, a power supply 16, a volatile memory 18, an non-volatile memory 20, a multimedia user interface 20, and a processing system that includes at least one central processing unit (CPU) 50 (or host processor) and one or more digital signal processors, two of which are shown, i.e., DSP1 60 and DSP2 70. The IED 10 also includes a Field Programmable Gate Array 80 which performs a number of functions, including, but not limited to, acting as a communications gateway for routing data between the various processors 50, 60, 70, receiving data from the A/D converters 14 performing transient detection and capture and performing memory decoding for CPU 50 and the DSP processor 60. In one embodiment, the FPGA 80 is internally comprised of two dual port memories to facilitate the various functions. It is to be appreciated that the various components shown in FIG. 1 are contained within housing 90. Exemplary housings will be described below in relation to FIGS. 2A-2H.

The plurality of sensors 12 sense electrical parameters, e.g., voltage and current, on incoming lines, (i.e., phase A, phase B, phase C, neutral N), from an electrical power distribution system 11 e.g., an electrical circuit. In one embodiment, the sensors 12 will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 50, DSP1 60, DSP2 70, FPGA 80 or any combination thereof.

A/D converters 14 are respectively configured to convert an analog voltage output to a digital signal that is transmitted to a gate array, such as Field Programmable Gate Array (FPGA) 80. The digital signal is then transmitted from the FPGA 80 to the CPU 50 and/or one or more DSP processors 60, 70 to be processed in a manner to be described below.

The CPU 50 or DSP Processors 60, 70 are configured to operatively receive digital signals from the A/D converters 14 (see FIG. 1) to perform calculations necessary to determine power usage and to control the overall operations of the IED 10. In some embodiments, CPU 50, DSP1 60 and DSP2 70 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 80. In some embodiments, the digital samples, which are output from the A/D converters 14 are sent directly to the CPU 50 or DSP processors 60, 70, effectively bypassing the FPGA 80 as a communications gateway.

The power supply 16 provides power to each component of the IED 10. In one embodiment, the power supply 16 is a transformer with its primary windings coupled to the incoming power distribution lines and having windings to provide a nominal voltage, e.g., 5 VDC, +12 VDC and −12 VDC, at its secondary windings. In other embodiments, power may be supplied from an independent power source to the power supply 16. For example, power may be supplied from a different electrical circuit or an uninterruptible power supply (UPS).

In one embodiment, the power supply 16 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor dividing power supplies are also contemplated.

The multimedia user interface 22 is shown coupled to the CPU 50 in FIG. 1 for interacting with a user and for communicating events, such as alarms and instructions to the user. The multimedia user interface 22 may include a display for providing visual indications to the user. The display may be embodied as a touch screen, a liquid crystal display (LCD), a plurality of LED number segments, individual light bulbs or any combination. The display may provide information to the user in the form of alpha-numeric lines, computer-generated graphics, videos, animations, etc. The multimedia user interface 22 further includes a speaker or audible output means for audibly producing instructions, alarms, data, etc. The speaker is coupled to the CPU 50 via a digital-to-analog converter (D/A) for converting digital audio files stored in a memory 18 or non-volatile memory 20 to analog signals playable by the speaker. An exemplary interface is disclosed and described in commonly owned pending U.S. application Ser. No. 11/589,381, entitled "POWER METER HAVING AUDIBLE AND VISUAL INTERFACE", which claims priority to expired U.S. Provisional Patent Appl. No. 60/731,006, filed Oct. 28, 2005, the contents of which are hereby incorporated by reference in their entireties.

The IED 10 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The IED 10 further comprises a volatile memory 18 and a non-volatile memory 20. In addition to storing audio and/or video files, volatile memory 18 will store the sensed and generated data for further processing and for retrieval when called upon to be displayed at the IED 10 or from a remote location. The volatile memory 18 includes internal storage memory, e.g., random access memory (RAM), and the non-volatile memory 20 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory will be used for storing historical trends, waveform captures, event logs including timestamps and stored digital samples for later downloading to a client application, web-server or PC application.

In a further embodiment, the IED 10 will include a communication device 24, also know as a network interface, for enabling communications between the IED or meter, and a remote terminal unit, programmable logic controller and other computing devices, microprocessors, a desktop computer, laptop computer, other meter modules, etc. The communication device 24 may be a modem, network interface card (NIC), wireless transceiver, etc. The communication device 24 will perform its functionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection will operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 10 may communicate to a server or other computing device via the communication device 24. The IED 10 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. The server will further include a storage medium for storing a database of instructional videos, operating manuals, etc., the details of which will be described in detail below.

In an additional embodiment, the IED 10 will also have the capability of not only digitizing waveforms, but storing the waveform and transferring that data upstream to a central computer, e.g., a remote server, when an event occurs such as a voltage surge or sag or a current short circuit. This data will be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform will also allow the CPU 50 to compute other electrical parameters such as harmonics, magnitudes, symmetrical components and phasor analysis. Using the harmonics, the IED 10 will also calculate dangerous heating conditions and can provide harmonic transformer derating based on harmonics found in the current waveform.

In a further embodiment, the IED 10 will execute an e-mail client and will send e-mails to the utility or to the customer direct on an occasion that a power quality event occurs. This allows utility companies to dispatch crews to repair the condition. The data generated by the meters are used to diagnose the cause of the condition. The data is transferred through the infrastructure created by the electrical power distribution system. The email client will utilize a POP3 or other standard mail protocol. A user will program the outgoing mail server and email address into the meter. An exemplary embodiment of said metering is available in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 10 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system. In one non-limiting exemplary embodiment, the IED includes a general purpose operating system, e.g., Linux™, although other general purpose operating systems are contemplated to be within the scope of the present disclosure.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 2A:
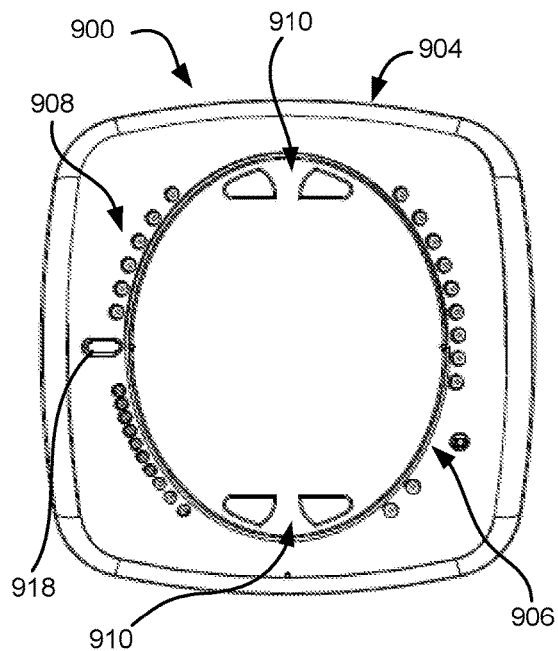
FIGS. 2A-2H illustrate exemplary form factors for an intelligent electronic device (IED) in accordance with an embodiment of the present disclosure.
Figure 2B:
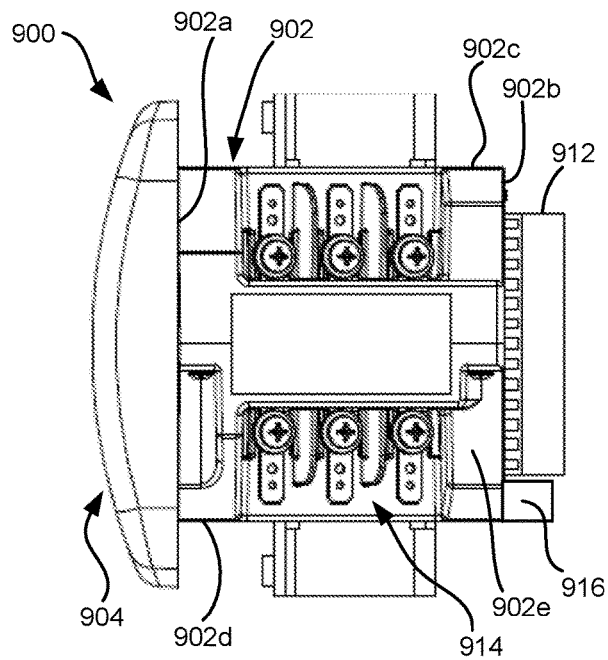

Furthermore, it is to be appreciated that the components and devices of the IED of FIG. 1 may be disposed in various housings depending on the application or environment. For example, the IED 10 may be configured as a panel meter 900 as shown in FIGS. 2A and 2B. The panel meter 900 of FIGS. 2A and 2B is described in more detail in commonly owned U.S. Pat. No. 7,271,996, the contents of which are hereby incorporated by reference. As seen in FIGS. 2A and 2B, the IED 900 includes a housing 902 defining a front surface 902a, a rear surface 902b, a top surface 902c, a bottom surface 902d, a right side surface 902e, and a left side surface (not shown). Electrical device 900 includes a face plate 904 operatively connected to front surface 902a of housing 902. Face plate 904 includes displays 906, indicators 908 (e.g., LEDs and the like), buttons 910, and the like providing a user with an interface for visualization and operation of electrical device 100. For example, as seen in FIG. 2A, face plate 904 of electrical device 900 includes analog and/or digital displays 906 capable of producing alphanumeric characters. Face plate 904 includes a plurality of indicators 908 which, when illuminated, indicate to the user the "type of reading", the "% of load bar", the "parameter designation" which indicates the reading which is being displayed on displays 906, a "scale selector" (e.g., Kilo or Mega multiplier of Displayed Readings), etc. Face plate 904 includes a plurality of buttons 910 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 902 includes voltage connections or inputs 912 provided on rear surface 902b thereof, and current inputs 914 provided along right side surface 902e thereof. The IED 900 may include a first interface or communication port 916 for connection to a master and/or slave device. Desirably, first communication port 916 is situated in rear surface 902b of housing 902. IED 900 may also include a second interface or communication port 918 situated on face plate 904.

Figure 2C:
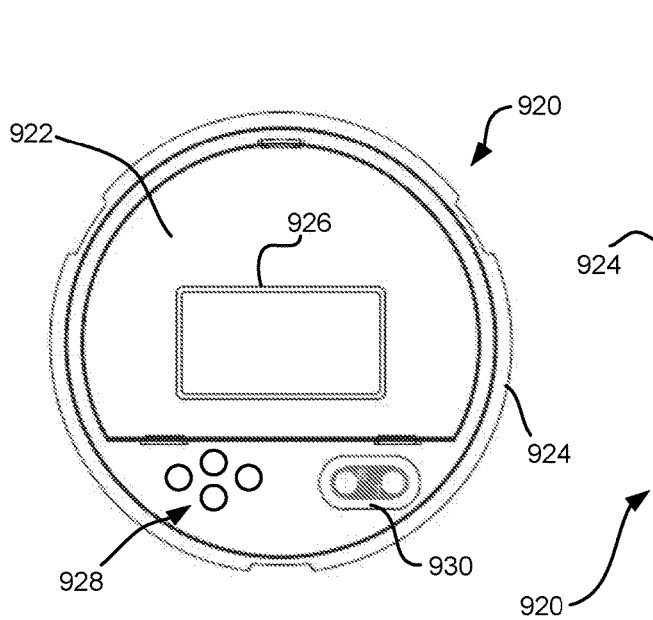
Figure 2D:
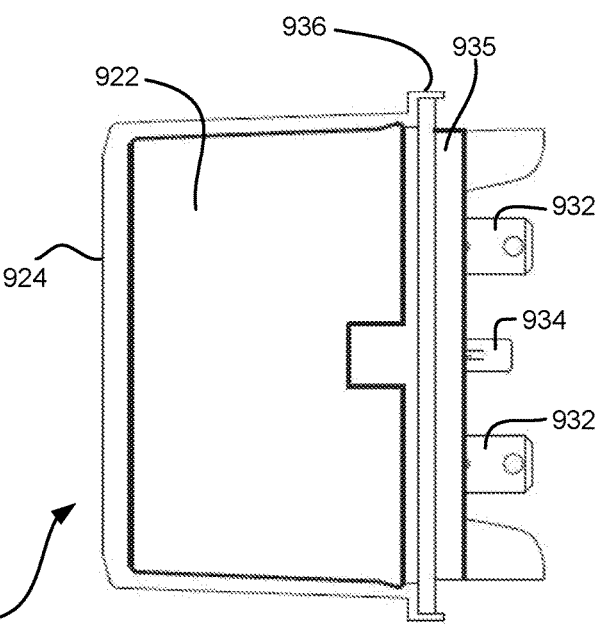

In another embodiment, the IED 10 may be configured as a socket meter 920, also known as a S-base type meter or type S meter, as shown in FIGS. 2C and 2D. The socket meter 920 of FIGS. 2C and 2D is described in more detail in commonly owned application Ser. No. 12/578,062 (U.S. Publication No. 2010/0090680), the contents of which are hereby incorporated by reference. Referring to FIGS. 2C and 4D, the meter 920 includes a main housing 922 surrounded by a cover 924. The cover 924 is preferably made of a clear material to expose a display 926 disposed on the main body 922. An interface 928 to access the display and a communication port 930 is also provided and accessible through the cover 924. The meter 920 further includes a plurality of current terminals 932 and voltage terminals 934 disposed on backside of the meter extending through a base 935. The terminals 932, 934 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 936 is used as a seal between the meter 920 and/or cover 924 and the meter socket to prevent removal of the meter and to indicate tampering with the meter.

Figure 2E:
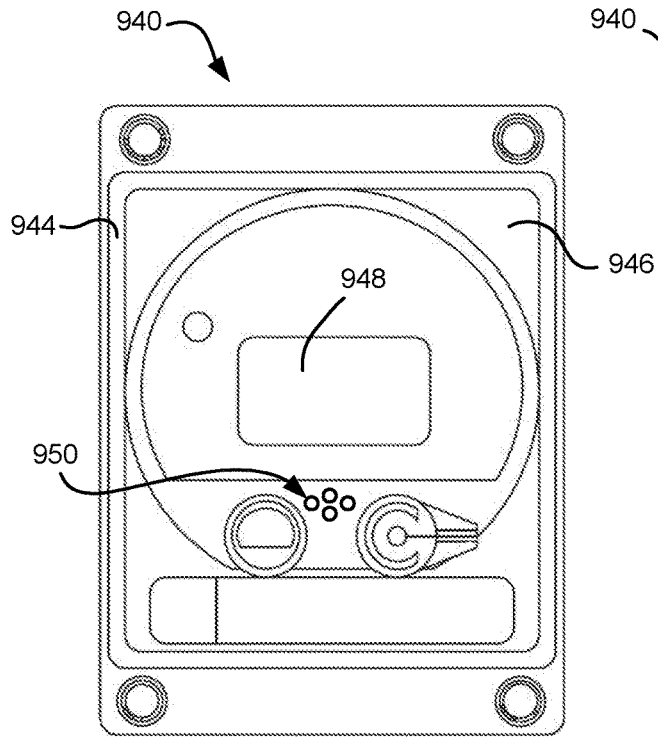
Figure 2F:
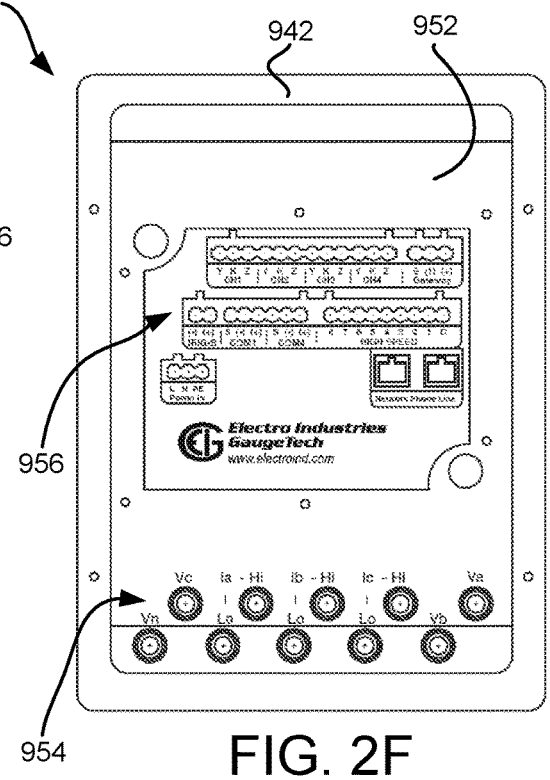

In a further embodiment, the IED 10 of FIG. 1 may be disposed in a switchboard or draw-out type housing 940 as shown in FIGS. 2E and 2F, where FIG. 2E is a front view and FIG. 2F is a rear view. The switchboard enclosure 942 usually features a cover 944 with a transparent face 946 to allow the meter display 948 to be read and the user interface 950 to be interacted with by the user. The cover 944 also has a sealing mechanism (not shown) to prevent unauthorized access to the meter. A rear surface 952 of the switchboard enclosure 942 provides connections for voltage and current inputs 954 and for various communication interfaces 956. Although not shown, the meter disposed in the switchboard enclosure 942 may be mounted on a draw-out chassis which is removable from the switchboard enclosure 942. The draw-out chassis interconnects the meter electronics with the electrical circuit. The draw-out chassis contains electrical connections which mate with matching connectors 954, 956 disposed on the rear surface 952 of the enclosure 942 when the chassis is slid into place.

Figure 2G:
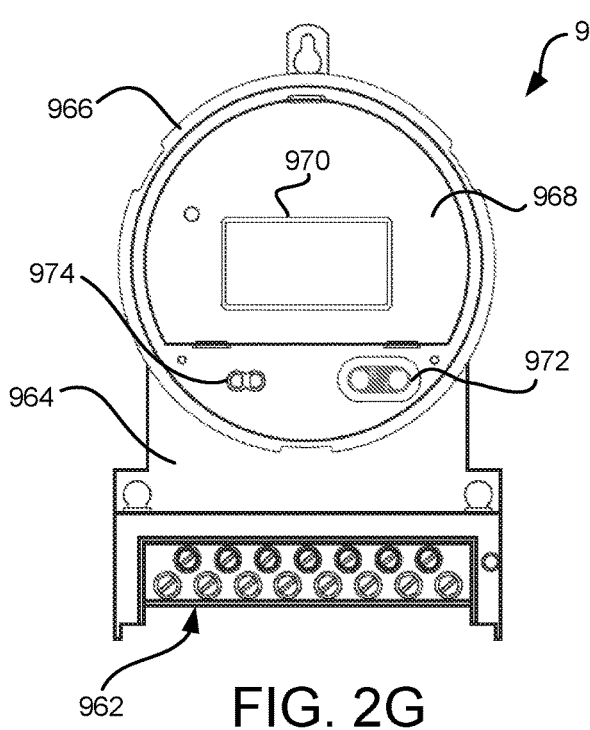
Figure 2H:
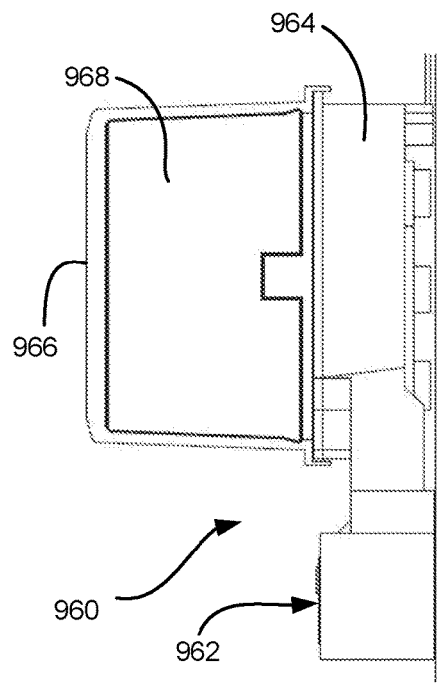

In yet another embodiment, the IED 10 of FIG. 1 may be disposed in a A-base or type A housing as shown in FIGS. 2G and 2H. A-base meters 960 feature bottom connected terminals 962 on the bottom side of the meter housing 964. These terminals 962 are typically screw terminals for receiving the conductors of the electric circuit (not shown). A-base meters 960 further include a meter cover 966, meter body 968, a display 970 and input/output means 972. Further, the meter cover 966 includes an input/output interface 974. The cover 966 encloses the meter electronics 968 and the display 970. The cover 966 has a sealing mechanism (not shown), which prevents unauthorized tampering with the meter electronics.

As described above, IED 10 may be coupled to a communication network (such as the Internet) via communication device 24 in multimedia interface 22. Although it is advantageous for IED 10 to be coupled to the Internet, there are many security risks associated with devices coupled to the Internet. For example, IEDs (such as IED 10) often contain valuable and/or private information accessible through the Internet. Also, many functions (i.e., "secure functions") of the IED may be controlled via the Internet. To protect IEDs, such as IED 10, from unauthorized use via the Internet, improved security measures may be implemented as will be described below in accordance with the present disclosure.

I. Security Key

One security problem faced by many networked devices, including IEDs such as IED 10, is default password reuse. Users often forget to change the default passwords, choose not to change them for ease of use, or worse yet, security is oft times left disabled. However, these defaults are often published, which makes it easy to scan for devices which still use the defaults.

In one embodiment, to avoid default password reuse, IED 10 is configured to force the user to configure a new password before any secure functionality is enabled, such as relay control, logging, metering, or settings configuration. For example, the first access to a web server executing on the IED may present a meter initialization page, which allows the user to enter initial settings, such as cVpt ratios, logging configuration, energy scaling, limits, communications settings, and an initial password. Such an interface would require an external method of resetting those settings, in the event that someone unauthorized was able to access the IED before first use.

Another embodiment to avoid default password reuse is to generate a unique security key for each IED. This would prevent a single password from being used to scan and access multiple IEDs. For example, one IED may have a default password of '1234', and another may have a default password of '1324'. The user would have to know what the default password for that device was specifically to access it. The user would still be able to configure their own password to override the default password.

One embodiment of a unique security key is to use the serial number of the IED. This has the advantage of being easy to remember on the users part, but makes breaking the default password easier. This unique security key embodiment may be improved by generating the security key from the serial number of the IED, rather than using it directly. For example, an algorithmic permutation of the serial number, such as reversing the characters, shifting them, or bit-or'ing them with the model number of the IED, may be used.

Another embodiment of a unique security key is to randomly generate a key when the IED is built, and store that key in the IED, e.g., in memory 20, and in a production database. Since the key is random, the password would have to be intercepted or stolen to break. For example, as part of the process of building the IED, a random unique key is generated, programmed into the IED using a hardware interface or IED software which is only accessible in production, and then stored in the production database for later use.

A key generated in production may be improved by tying it directly to the customer that ordered the IED. Such a link between the customer and key may be used to verify that a valid user is requesting the default password from the manufacturer when they have forgotten it. Such a key may also be used to prevent the resale of the IED through third parties, as only the original purchaser would have legitimate access to the default key.

Since it is generated in the production of the IED, such a unique security key would have to be transferred to the owner of the IED. One way to perform this is to put the key on a sticker on the side of the IED (for example, on the outside of any of the housing described in reference to FIGS. 2A-H), such that the user must have physical access to the IED to determine the default password. The security of using a sticker may be improved by placing the sticker on the inside of the housing of the IED, such that a casual passerby would not be able to read the key.

Another way to transfer the password to the user would be to include it in paperwork which comes with the IED when the IED is purchased, such as brochures, certificates, calibration reports, or a user key insert. Such a method would have the advantage that the security key may be stored separate from the IED, and may be easily destroyed by the user if they desired.

It is envisioned that such a method may also be used to recover a lost default security key for a customer, by cross referencing the customer's ID with the serial number. The security key may then be mailed or emailed to the customer using an address configured separate from the password request, to prevent invalid users from faking a request.

Storing the security key on a replaceable or removable media would allow the security key to be easily determined, as well as copied across multiple IEDs. In one embodiment, the security key is stored on an external processor or memory coupled to a first or "core" processor. The core processor is configured such that for the core processor to execute a request or a software application, the core processor must send the request or software application to the external processor to be decrypted using a security key that is only accessible on the external processor. Therefore, the core processor, which may be accessible by multiple clients outside of the IED containing the core processor, will never have access to the security key and cannot be compromised by unauthorized users. For example, referring to FIG. 3, an IED 300 configured to store a security key on an external processor, e.g., processor B 304, is shown in accordance with an embodiment of the present disclosure. It is to be appreciated that, although not shown in FIG. 3, IED 300 includes similar components to IED 10.

Figure 3:
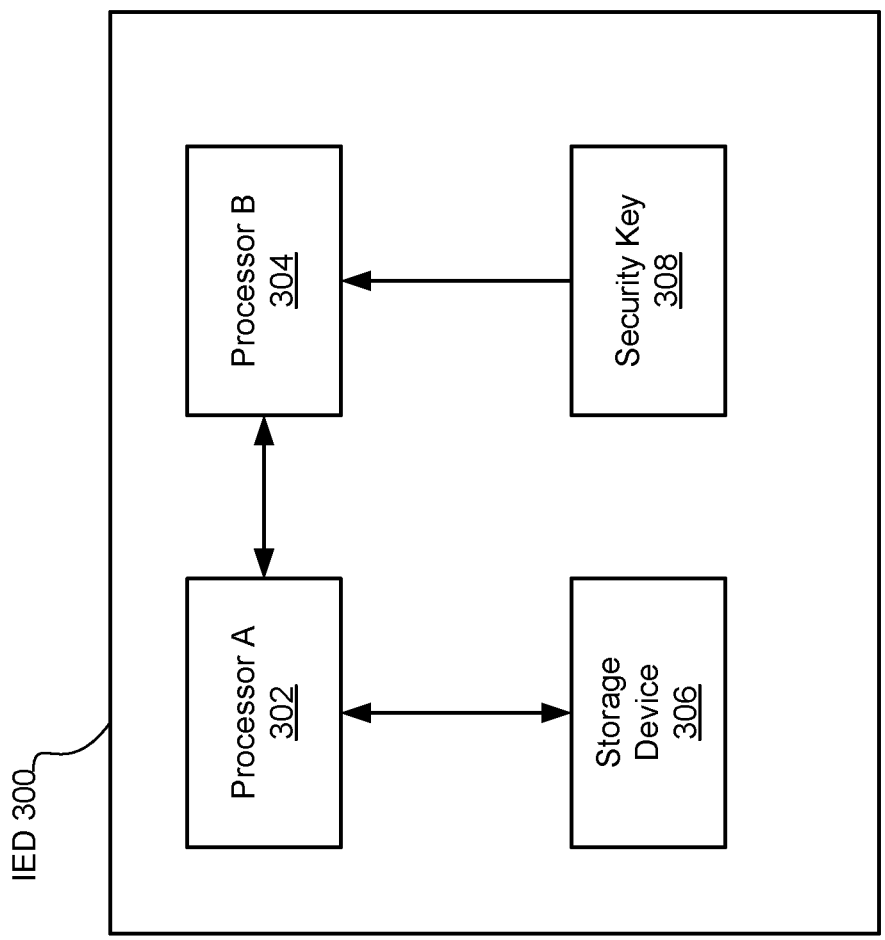
FIG. 3 illustrates an example of a meter or an intelligent electronic device (IED) with security key storage in accordance with an embodiment of the present disclosure.

As shown in FIG. 3, IED 300 includes processor A 302, processor B 304, storage device 306, and security key 308. More specifically, processor A 302 is coupled to storage device 306 and processor B 304 and processor B 304 is coupled to security key 308. Processor A 302 is configured to execute software and retrieve information stored in storage device 306 of IED 300. Furthermore, processor A 302 is configured such that processor A cannot execute certain software or requests (i.e., secure functions) unless the software or requests are first decrypted. Processor A 302 cannot decrypt secure software or requests without the aid of processor B 304; therefore, processor A 302 will send any secure software or requests received by processor A 302 to processor B 304. Processor B 304 is configured to receive requests and software from processor A 302 and attempt to decrypt the request or software using security key 308. It is to be appreciated that, in certain embodiments, processor B is the only component in IED 300 that has access to security key 308. Also, it is to be appreciated that security key 308 may be stored in processor B 304, or alternatively, security key 308 may be stored on either volatile or non-volatile memory coupled to IED 300 (not shown).

The above-described embodiment allows the software running on processor A 302 to be dynamically loaded from storage 306, such that even if storage 306 is replaced, the security key 308 is still tied to IED 300. It is to be appreciated that, although it is not required, it is preferable that if security key 308 cannot be read, all secure functionality should be shut down.

Alternatively, security key 308 may serve as an "internal password" to verify that only secure software is being executed on processor A 302. For example, a user may transmit software to IED 300 (e.g., via the Internet) to be executed on processor A 302 to perform a secure function. When processor A 302 receives the software to be executed, processor A 302 will determine the size of the software to be executed. If the size of the software to be executed is below a predetermined threshold, processor A 302 will transmit the software to processor B 304. Processor B 304 will then attempt to decrypt the software using security key 308. If processor B 304 is able to decrypt the software using security key 308, processor B 304 will send the decrypted software to processor A and processor A will execute the decrypted software. However, if processor B 304 cannot decrypt the software, processor B 304 will transmit an error message to processor A 302 indicating that the software cannot be decrypted and therefore cannot be executed. In an alternative embodiment, when processor B 304 fails to decrypt the software, processor B 304 will transmit the software to processor A 302 and processor A 302 will attempt to run the software and fail. It is to be appreciated that the security key 308 is configured such that, only software that is desired by the manufacturer to be executed on IED 300 will be able to be decrypted by processor B 304 using security key 308.

Alternatively, if processor A 302 determines that the software received is above a predetermined threshold, processor A 302 will send a "payload key" (that is received with the software and is part of the software package) to processor B 304 for a key allowing processor A 302 to decrypt the software. When processor B 304 receives the payload key from processor A 302, processor B 304 will attempt to decrypt the payload key using security key 308 to produce a decrypted payload key. If processor B 304 is able to decrypt the payload key using security key 308 to produce a decrypted payload key, processor B 304 will transmit the decrypted payload key to processor A 302 and processor A 302 will use the decrypted payload key to decrypt the software and then execute the decrypted software. However, if processor B 304 is unable to decrypt the payload key using security key 308, processor B 304 will transmit an error message to processor A indicating that the payload key cannot be decrypted and therefore the software cannot be executed.

As described above, processor A 302 is also configured to receive requests, such as requests to read data stored in storage device 306. Processor A 302 is configured such that processor A 302 cannot decrypt any requests to read data stored in storage device 306. Therefore, when processor A 302 receives a request, processor A 302 transmits the request to processor B 304. Processor B 304 will then attempt to decrypt the request using security key 308. If processor B 304 is able to decrypt the request using security key 308, processor B 304 will transmit the decrypted request to processor A, and processor A will then be able to execute the request and read the requested data stored in storage device 306. Alternatively, if processor B 304 is unable to decrypt the request using security key 308, processor B 304 will transmit an error message to processor A, indicating that the request could not be decrypted and therefore will not be executed. It is to be appreciated that security key 308 is configured such that only legitimate requests (i.e., requests from users authorized to access the requested data) can be decrypted by processor B 304 using security key 308.

It is to be appreciated that, in one embodiment, to decrypt software or requests received from processor A 302, processor B 304 includes a cryptographic module (not shown in FIG. 3). The cryptographic module includes stored instruction signals that can be executed by processor B 304.

Preferably, the cryptographic module allows for the encryption and/or decryption of provided data (i.e., software and requests received from processor A 302). Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource.

Preferably, the cryptographic module supports encryption schemes allowing for the secure transmission of information across a communications network to enable a client to engage in secure transactions if so desired by users. Most frequently, the cryptographic module communicates with information servers, operating systems, other program modules, and/or the like. The cryptographic module may contain, communicate, generate, obtain, and/or provide program module, system, user, and/or data communications, requests, and/or responses. In one non-limiting example embodiment, such a cryptographic tool may be provided as a library within the operating system accessible to all other modules in a module collection through an application program interface (API), as will be described in an embodiment below. The cryptographic tool enables local processing of authentication information.

In one embodiment, the cryptographic module employs transport level encryption, for example, STARTTLS. STARTTLS is a TLS (SSL) layer over the plaintext communication, allowing email servers to upgrade their plaintext communication to encrypted communication. Assuming that the email servers on both the sender and the recipient side support encrypted communication, an eavesdropper snooping on the communication between the mail servers cannot see the email contents.

In another embodiment, the cryptographic module employs end-to-end encryption. In end-to-end encryption, the data is encrypted and decrypted only at the end points. In other words, encrypted requests or software are unreadable by processor A 302, and are only decrypted at processor B 304 (i.e., the request or software end point) using security key 308.

It is to be appreciated that the teachings of the embodiment shown in FIG. 3 may be implemented with IED 10 shown in FIG. 1. For example, in one embodiment, CPU in IED 10 may contain multiple processors, including processor A 302 and processor B 304. Furthermore, security key 308 may be included in volatile memory 18, non-volatile memory 20, or in one of the processors in IED 10. Also, storage device 306 may be volatile memory 18. Alternatively, in another embodiment, DSP1 60 in IED 10 may include one of processor A 302 or processor B 304, and DSP2 70 in IED 10 may include whichever of processor A 302 or processor B 304 is not included in DSP1 60. In yet another embodiment, CPU 50 may include processor A 302 and either DSP1 60 or DSP2 70 may include processor B 304.

For example, in one embodiment, IED 10 is configured such that CPU 50 includes both processor A 302 and processor B 304, and security key 308 is in non-volatile memory 20. Communications device 24 may receive a request or software to be executed on IED 10. The request or software will then be transmitted to CPU 50. In CPU processor A 302 will send the request or software (or a payload key if the software is too large, as described above) to processor B 304 so that processor B 304 can decrypt the request or software (or payload key) using security key 308. If processor B 304 is able to decrypt the request or software (or payload key), then the decrypted request or software will be transmitted to processor A 302, where it will be executed. However, if processor B 304 is unable to decrypt the request or software (or payload key), the request or software will not be executed.

Storing the security key 308 externally (i.e., on a separate processor from the processor that executes secure functions) may be improved by splitting the security key 308 into multiple components, each of which comes from a different location, such that it would be harder to copy or manipulate the key 308. For example, security key 308 may be broken into 3 components, 4 bytes each, with each component coming from a different location, such as a compact flash file, a key compiled into the core software, and an external processor. It is to be appreciated that this approach can be used with IED 10. For example, one component of security 308 may be stored in processor B, another may be stored in non-volatile memory 20, and another may be stored in volatile memory 18. As another non-limiting example, the security key 308 is generated by iteratively encrypting the key with the next layer's key component, such as encrypting an external processor key with a firmware key, then encrypting the result with the file key, giving the final security key.

In another embodiment, splitting the security key 308 into multiple components may be improved by changing the components of security key 308, such that the total security changes over time in a controllable manner. For example, the Component of the security key 308 which comes from firmware may be changed in every firmware version, allowing the security key 308 to be changed by the manufacturer at will. As another non-limiting example, one component of the security key 308 may come from a time chip, such that the generated security key 308 changes with time, such as every hour. It is to be appreciated that the time chip may be a real time clock (RTC) coupled to the processor B 304 or integrated into processor B 304. Furthermore, in the context of IED 10, the time chip may be integrated into CPU 50.

Dynamic security keys could be extended to apply to user programmed passwords. One embodiment of this would be to have a timeout on user programmed passwords, such that after the timeout expires, the password reverts to the default dynamic security key. In this embodiment, the user programmed password may be stored, for example, in volatile memory 18, while the default dynamic security key is stored in non-volatile memory 20 or CPU 50.

In another embodiment using dynamic security keys, the user may configure a list of multiple passwords, which the IED will change between at predetermined time intervals. For example, a list of 7 passwords is configured, one of which is used for each day of the week. As another example, a list of 24 passwords may be configured, one used for each hour of the day.

In yet another embodiment, a static portion and a dynamic portion of the password are configured, using either a password list, or value replacement. For example, a base passphrase of "the $ walked across the street" may be configured, and a list of 7 dynamic passwords may be configured, such as 'cat', 'dog', 'elephant', 'rain', '7u&r', 'Y#!I', 'umbrella'. The resultant password for each day of the week would then be a combination of the base passphrase and the day's key, such as 'the cat walked across the street', or 'the Y#!I walked across the street'. In the context of IED 10, the base passphrase and dynamic passwords can be stored in non-volatile memory 20 or volatile memory 18, while the resultant password is stored in volatile memory 18. As another example, a base password of 'yU63##hq' may be configured, where the '##' is replaced with the hour of the day, the minute of the hour, day of the year, number of waveform records, or some other value. It is to be appreciated a combination of the above may also be used, as well as multiple dynamic lists, as well as using a dynamic list to generate each key in another dynamic list used in the primary dynamic key.

Security key 308 could be further extended by separating the security key 308 from the default password, such as using the security key 308 to generate the default password, or using the default password to generate the security key 308. Alternatively, multiple security keys may be stored, such that a public key and a private key are stored. The private key may be used for encryption and password generation purposes, and the public key may be used for unique identification.

The use of a public key allows for unique identification of the IED on a network, or for logging into a service. For example, the public key may be used as part of the certificate in Transport Layer Security (TLS) identification of the web server executing on the IED, allowing clients to be assured that they are communicating to the correct IED. As another example, the public key may be combined with the private key to generate a unique signature to be transmitted to a data collection server when uploading log data, to verify the origin of the data. As another example, a challenge and response protocol may require the unique signature to be transmitted to the client before they entered the password, to prevent them from sending a valid password to a fake meter trying to steal the password. As another example, the public key of the meter may be the TLS certificate.

II. Isolation of Security Features from External Interfaces

Along with more IEDs becoming network accessible, the interest in the use of common protocols to access IEDs, such as Web Servers, DNP, and IEC61850, has increased. However, many of these interfaces require the ability to perform secure actions. Additionally, many of these interfaces are well known protocols and services, making it easier to target flaws in the code.

In one embodiment, to prevent exposing secure actions on a networked interface, the security features are isolated from these external interfaces, such that the external interface, such as a web page, does not contain the ability to perform the secure action, but instead acts as a proxy and instructs an internal software to perform the secure action. In such an embodiment, the processing of the message and parameters are separated from the actual execution of the action. This prevents malformed messages from causing unintended side effects. Let such a configuration, where communication and security features are in separate software components, be called "functional layers."

It is to be appreciated that functional layers may include internal and external software components. The 'functional' part references the ability of such a configuration to provide a set of functional actions, such as requesting web pages on the external layer, and resetting the device on internal layers. The 'layer' part references the ability of the external layers to 'hide' the internal layers from the outside. It is also to be appreciated that in the presently described embodiment internal and external layers can only communicate with each other through a limited API, further restricting the access from one layer to another, to only that which has been granted access to. Let the secure internal component, which has access to security features, but cannot be accessed from outside the IED, be called the "secure layer." Let the external interface software, which cannot access the secure features, but can be accessed from outside the IED, be called the "insecure layer."

Figure 4:
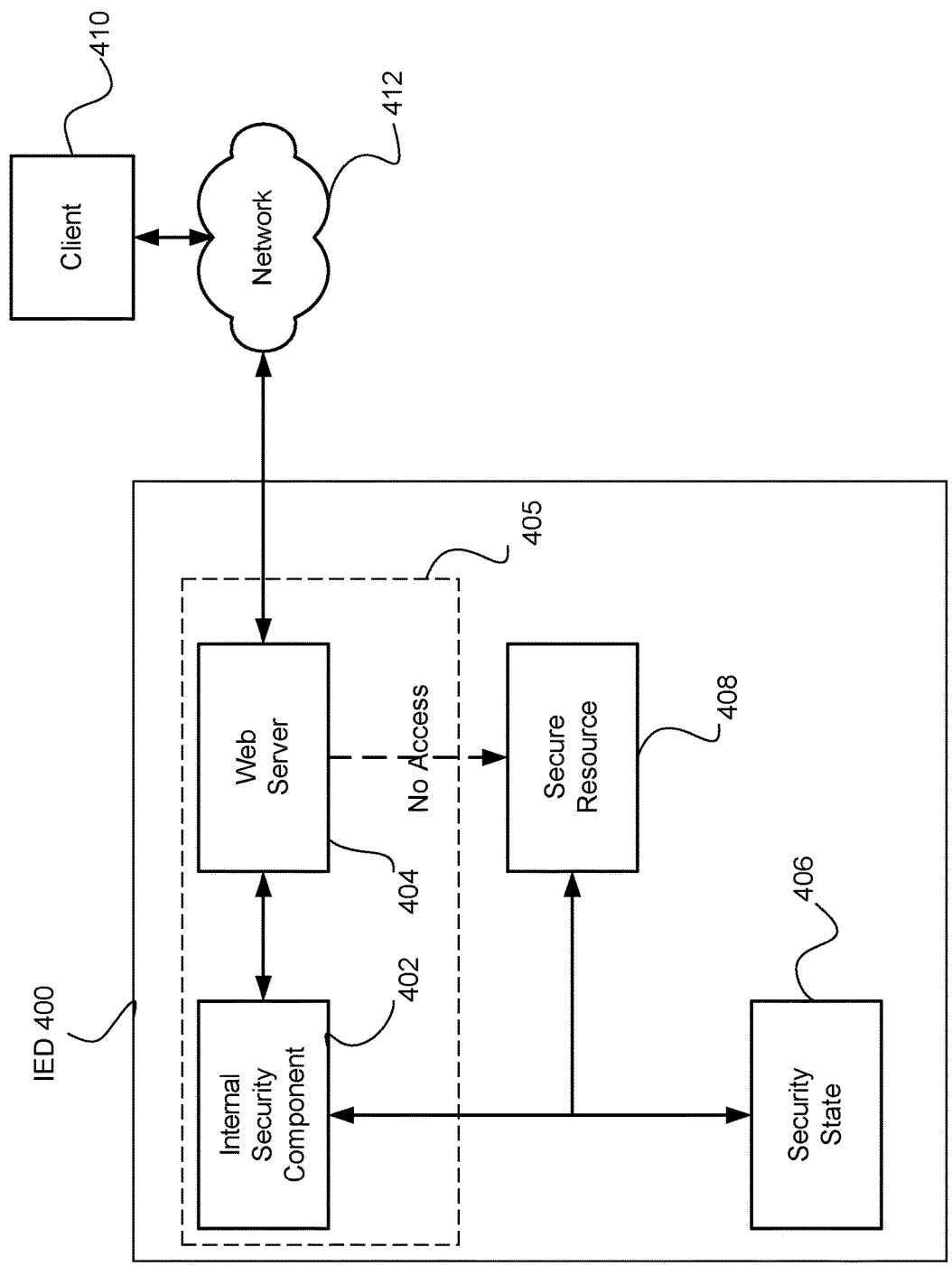
FIG. 4 is an example of functional separation security in an IED in accordance with an embodiment of the present disclosure.

Turning to FIG. 4, an IED 400 with a secure and insecure layer is shown in accordance with an embodiment of the present disclosure. IED 400 includes internal security component 402 (i.e., the secure layer), web server 404 (i.e., the insecure layer), security state 406, and secure resource 408, where web server 404 is coupled to internal security component 402 and internal security component 402 is coupled to security state 406 and secure resource 408. It is to be appreciated that, in some embodiments, security component 402 and web server 404 may be included in a single processor 405 (as shown in FIG. 4), while in other embodiments security component 402 and web server 404 may be on separate processors. Also, it to be appreciated that internal security component 402 may also include a cryptographic module (not shown in FIG. 4) as described above in relation to processor B 304. The cryptographic module can perform the same functions as those performed by the cryptographic module in processor B 304.

IED 400 executes a plurality of instructions to implement a general purpose operating system, e.g., Linux™ operating system, for executing the security component 402 and the web server 404, among other components. IED 400 is coupled to network 412 (e.g., the Internet) via web server 404. Client 410 is coupled to network 412 to allow a user to access certain functions of IED 400. It is to be appreciated that IED 400 includes many other components (not shown), such as those described in IED 10, however, these additional components will not be described again in reference to IED 400 in the interest of clarity. Furthermore, it is to be appreciated that the components of IED 400 may be included in IED 10. For example, processor 405 may be included in CPU 50, and security state 406. Additionally, secure resource 408 may be included in volatile memory 18 or non-volatile memory 20 or some combination thereof. Web server 404 may communicate with network 412 and client 410 via communication device 24.

Turning again to FIG. 4, as an example of IED 400 in use, the web server 404 of the IED 400 may receive a message requesting a reset from client 410. The web server 404 parses the parameters to do the reset, validates them, and passes the command on to an internal security component 402 that has permission to actually perform the action. As another example, a malformed request for historical logs may contain an exploit that overruns the internal buffers of the web server 404. Because the web server 404 does not contain the ability to execute any secure action, it may crash, but it would be much harder to trigger a secure action.

As yet another example, a request for a secure resource 408 in IED 400, such as, but not limited to, the list of users, may be passed through the internal security component 402, such that the user sending the request from client 410] must first login. When the resource is requested, if the user sending the request from client 410 is not in the list of allowed users (where the list of allowed users is stored in security state 406) for that resource 408, the request is denied. Since the web server 404 doesn't have access to the security list stored in security state 406, it cannot be exploited to access it.

One embodiment of functional layers is to implement the internal security component 402 as a software running separately from the external interface software (i.e. web server) 404. In such an embodiment, the layers may use network sockets, files, pipes, shared memory, mail slots, or other Inter-Process Communications, or IPC methods, to transfer information between the layers. For example, a kernel such as a Linux™ kernel, which supports functional isolation of executing software, and a security server may be used, such that only the security server (i.e., internal security component 402) has permission to access secure resources 408, and all software in the insecure layers (e.g., web server 404) would have to communicate with the security server-software 402 to gain access to these resources 408.

In another embodiment of functional layers, the secure layer software 402 may be implemented on a separate component of the hardware, where such a configuration was described above in reference to FIG. 3. For example, the insecure software, such as a web server 404, may be running on processor A 302, which is connected to processor B 304 by communications lines. Processor B 304 would be running the secure software 402, and would be the only processor that had physical connection to the secure resources 408, such as a compact flash media (e.g., storage device 306) with sensitive data on it, or hardware reset lines. No communications lines, other than those for processor A 302, would be attached to processor B 304, preventing it from being influenced externally.

In addition to preventing malicious or inadvertent modifications to the system, the functional layers described in accordance with the present disclosure can also be used to enforce user security. One embodiment to enforce user security would be to keep all awareness of user permissions and states, as well as all user actions, in the secure layer, e.g., internal security component 402. For example, updating the programmable settings may require that a user be logged in. In this embodiment, the secure layer 402 keeps track of the user state, and only allows the secure update programmable settings action to be performed if the user state is valid. It is to be appreciated that valid user states may be stored in security state 406 and secure layer 402 can determine whether the user state is valid by comparing a user state with a valid user state stored in security state 406. If the user state is invalid, then secure layer 402 rejects the update request. As another non-limiting example, secure data, such as, but not limited to, energy data may be restricted to only certain users. User A may be allowed to read energy, but User B may not. If User A requests energy data, then the secure layer 402 returns the data values. If User B requests energy data, then the secure layer 402 returns an error value. It is to be appreciated that the users that have access to secure data may be stored in security state 406 and secure layer 402 may determine if a user attempting to access secure data is a user that is authorized to view the data.

Functional layers can also be used to ensure data and configuration integrity. For example, web server 404, which provides the ability to update certain configurations of IED 400, such as programmable settings, firmware, or software, may take a configuration file as input, and pass the configuration file to the secure layer 402 to update. The secure layer 402 then verifies the configuration is valid before continuing with the action, such as checking for valid programmable settings, or verifying the software is for the proper IED model, or has not been corrupted. As another example, another internal layer may be introduced, such as a conversion layer (not shown in FIG. 4), which is configured to transform the internal stored data into a more convenient format to be used by the top layer (i.e., web server 404), such as converting binary historical data to text csv data to be displayed on a web page.

The communications between layers may be improved by encrypting the messages between the secure layer 402 and the insecure layer (e.g., web server) 404, using the IED's unique security key, password, or some other key stored in security state 406, and building the password security directly into the message system. For example, if web server 404 used the wrong password to encrypt a settings update request to the secure layer 402, the secure layer 402 would reject the command as invalid. As another example, when a Modbus server requests energy readings, the secure layer 402 responds to the request with encrypted values, but the Modbus server would be unable to decrypt the values if it did not have the password.

III. Prevent Device Copying and Direct Application Manipulation

Along with external security issues, IEDs also must deal with internal security issues, such as tampering, reverse engineering, and copying. However, as IED functionality becomes more complex and feature rich, it becomes easier to tamper with and copy the software.

In one embodiment to preventing copying and tampering, the software loaded onto the main processor of an IED is encrypted with a security key, such that only the IED which contained the proper security key would be able to run the software. For example, a small unencrypted bootloader may load the encrypted core software, decrypt it using the security key, and load the resultant code. If the decryption failed, due to an invalid key, the software would fail to run. As another example, the core software once running, loads, decrypts, and runs functional software, where any invalid decryptions would fail to run, or crash the whole system.

One embodiment of encrypted software would be to store the software encrypted, and use a kernel to perform the decryption and execution of the software. In such a system, the kernel would be running on the processor, load the application from a storage media, such as compact flash, sdram, flash, or other long term storage media, and use the security key to decrypt those software to run. In addition to decrypting the software, the kernel may also provide the functionality to encrypt and store the software to be run later, though this may also be implemented through an external software available only to the manufacturer.

Another embodiment of encrypted software would be to use a secure layer to request the software to run, for example, using a configuration such as that described in relation to IED 400 in FIG. 4. In such a system, secure layer 402 would perform the decryption and verification of the software.

In another embodiment, the individual feature softwares, such as a web server or logger, are stored in a single encrypted block, such that only software which had the ability to decrypt the block would be able to determine what softwares and features were available.

In another embodiment, a second processor is used to load and decrypt the software, for example, using a configuration such as that described in relation to IED 300 in FIG. 3. For example, the kernel running on processor A 302 may request from processor B 304 the software for the web server. Processor B 304 would load the software from the storage media 306, and decrypt it using the key 308 supplied by processor B 304, and return the decrypted data. If the decryption fails, processor B 304 would return an error. In such a system, processor B 304 supplies the security key 308. In such a system, multiple hardware component could also be replaced with multiple software components.

Using a security layer, such as a software (e.g., internal security component 402) or second processor (e.g., processor B 304), to decrypt and load the software would be improved by using a challenge and response to prevent direct querying of the software component. For example, if the requesting software does not respond to the challenge properly, the security layer (e.g., internal security component 402 or processor B 304) would respond with an error. As another example, the software challenges the security layer, and if the security layer doesn't respond properly, the software would assume the security layer is fake, and not send any secure information.

In addition to encrypting software, software may also be digitally keyed, such as placing a certificate in the binary, which would be verified before allowing the software to run. Such a verification could be performed as part of the decryption procedure. Additionally, since the binary is encrypted, the certificate can be reasonably assumed to be valid.

Digitally keying software can be extended by also keeping a manifest of software signatures, and comparing the signature of the software against the manifest before allowing it to run. Such a signature may be a checksum of the software binary, a certificate, or a pattern of known bytes in the binary. For example, referring to FIGS. 3 and 4 the security layer 402 or processor B 304 keeps a database of the checksums (the database may be stored in security state 406 or storage device 306) of all known softwares to be run on the IED, and when a software is loaded, the checksum is compared against the stored checksum. It is to be appreciated that the comparison may be made by processor B 304 if IED 300 is being used, or by internal security component 402 if IED 400 is being used. If the comparison fails, the software is assumed to be fake, and not run. It is to be appreciated that although the components of IEDs 300 and 400 can be implemented into IED 10, as described above, the components of IEDs 300 and 400 may be implemented into other IEDs as well, as will be described below.

Figure 5:
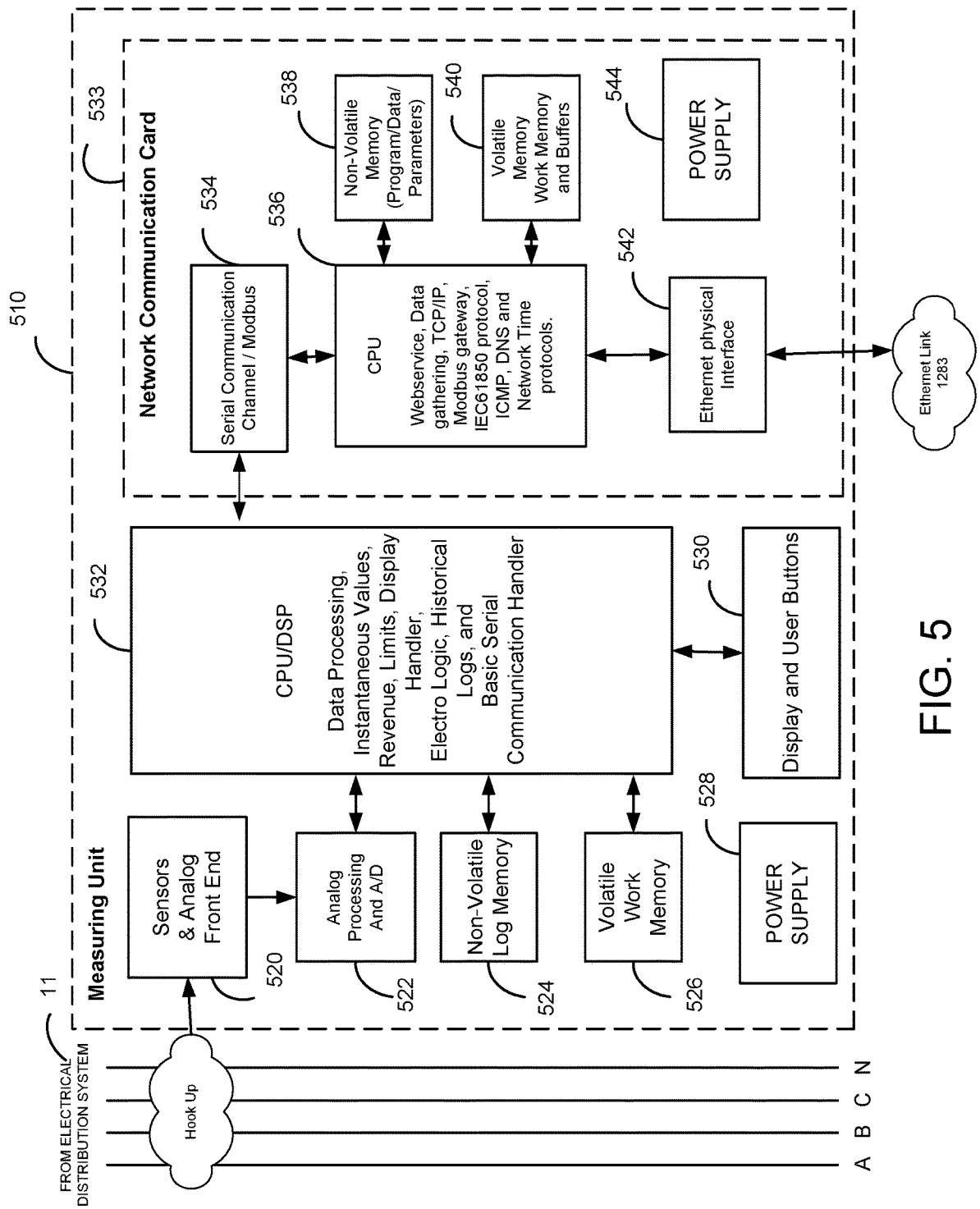
FIG. 5 is a block diagram of another IED according to an embodiment of the present disclosure.

Referring to FIG. 5 a block diagram of a measuring unit 510, i.e., an IED, including a network communication network card 533 for responding to user data and information requests regarding power usage and power quality for any metered point within a power distribution system 11 is shown. Furthermore, the communication card 533 is configured for sending/receiving alarm and/or notification messages.

The measuring unit 510 includes at least one sensor & analog front end 520, at least one analog processing and analog-to-digital (A/D) converter 522, at least one nonvolatile log memory 524, at least one volatile work memory 526, a power supply 528, display and user buttons interface 530, and a central processing unit (CPU) 532. The CPU 532 may be a processor, the functions of which may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

The network communication card 533 may be coupled to or disposed into the measuring unit 510 to extend communication capabilities of the measuring unit 510. These capabilities include: a Web Server that allows any Internet browser to connect to the measuring unit 510, a Modbus Server that allows a Modbus RTU client to connect to the measuring unit 510 for transferring data and operation parameters; and other supporting services. In one embodiment, the network communication card 533 implements an email alarm/notification feature to send emails when selected events occur. When an event is retrieved or identified by the network communication card 533, the event is classified according with user settings (as an Alarm or Notification), and an email body is created and placed into a buffer for later processing. If the event is an Alarm, the email is sent as soon as possible, for example, within a 1-minute window. If the event is a Notification, the email is sent within a user-programmed window, for example, which can range from about 5 minutes to about 24 hours.

The network communication card 533 is shown to include, in one embodiment, a serial communication interface 534 to communicate with the measuring unit 510 unit, a CPU 536, non-volatile memory 538, volatile memory 540, an Ethernet physical interface 542 and a power supply 544. The Ethernet physical interface 542 couples the measuring unit 510 to at least one network, e.g., the Internet, via an Ethernet link 1283. Also, power supply 544 in the network card, for example, is a block that represents the conversion of the host provided voltage (5 VDC) from power supply 528 into a voltage suited for the network card components, and electric isolation between both power rails.

It is to be appreciated that, as stated above, the components of IED 300 and 400 may be implemented with other IEDs as well. For example, IED 300 may be implemented with IED 510. Referring to FIGS. 3 and 5, in one embodiment, processor A 302 and processor B 304 may both be included in CPU 532, storage device 306 may be non-volatile log memory 524 and security key 308 may be either volatile work memory 526 or non-volatile log memory 524. It is to be appreciated that, in an alternative embodiment, processor A 302 may also be included in CPU 536.

Additionally, IED 400 may be implemented with IED 510. Referring to FIGS. 4 and 5, in one embodiment, web server 404 is included in CPU 536, internal security component 402 is included in CPU 532 and security state 406 and secure resource 408 are included in non-volatile log memory 524. In an alternative embodiment, internal security component 402 may be included in CPU 536 with web server 404 and security state 406 may be included in non-volatile work memory 524.

To prevent unauthorized access to the IEDs 10, 300, 400, 510 several different security methods and scheme may be employed within the scope of the present disclosure. In one embodiment, Multi-factor authentication (MFA) is employed. MFA is a method of access control which a user can pass by successfully presenting several separate authentication stages which include knowledge factors, possession factors and inherence factors. Knowledge factors include a password or secret word, a personal identification number (PIN), secret questions, among others. Possession factors include a key or device, e.g., a disconnected or connected token, which only the user has. Inherence factors are factors associated with the user, and are usually biometric methods, including fingerprint readers, retina scanners or voice recognition. It is to be appreciated that the MFA may include at least one factor or any combination thereof to authenticate a user.

In one embodiment, a security token is used to prevent unauthorized access to IEDs 10, 300, 400, 510. A security token (also known as a hardware token, authentication token, USB token, cryptographic token, software token, virtual token, or key fob) may be a physical device that an authorized user of a computer service or device is given to gain access to the information stored therein. Security tokens are used to prove one's identity electronically. Some tokens may store cryptographic keys, such as a digital signature, or biometric data, such as fingerprint minutiae. Some designs feature tamper resistant packaging, while others may include small keypads to allow entry of a PIN or a simple button to start a generating routine with some display capability to show a generated key number. Special designs include a USB connector, RFID functions or Bluetooth wireless interface to enable transfer of a generated key number sequence to a client system.

Security tokens include password types and physical types. Password token types include some secret information that are used to prove identity. There are four different ways in which this information can be used 1.) Static password token—The device contains a password which is physically hidden (not visible to the possessor), but which is transmitted for each authentication; 2.) Synchronous dynamic password token—A timer is used to rotate through various combinations produced by a cryptographic algorithm, where the token and the authentication server must have synchronized clocks; 3.) Asynchronous password token—A one-time password is generated without the use of a clock, either from a one-time pad or cryptographic algorithm; and 4.) Challenge response token—Using public key cryptography, it is possible to prove possession of a private key without revealing that key, the authentication server encrypts a challenge (typically a random number, or at least data with some random parts) with a public key; the device proves it possesses a copy of the matching private key by providing the decrypted challenge.

Password token types include time-synchronized one-time passwords and mathematical-algorithm-based one-time passwords. Time-synchronized one-time passwords change constantly at a set time interval, e.g. once per minute. Another type of one-time password uses a complex mathematical algorithm, such as a hash chain, to generate a series of one-time passwords from a secret shared key.

Physical token types include disconnected tokens, connected tokens, contactless tokens, Single sign-on software tokens and mobile device tokens. Disconnected tokens have neither a physical nor logical connection to the client computer or device. Disconnected tokens typically do not require a special input device, and instead use a built-in screen to display the generated authentication data, which the user enters manually themselves via a keyboard or keypad. Connected tokens are tokens that must be physically connected to the computer with which the user is authenticating. Tokens in this category automatically transmit the authentication information to the client computer or device once a physical connection is made, eliminating the need for the user to manually enter the authentication information. However, in order to use a connected token, the appropriate input device must be installed. The most common types of physical tokens are smart cards and USB tokens, which require a smart card reader and a USB port respectively.

Unlike connected tokens, contactless tokens form a logical connection to the client computer or device but do not require a physical connection. The absence of the need for physical contact makes them more convenient than both connected and disconnected tokens. An exemplary contactless token uses RFID to transmit authentication info from a keychain token. Another exemplary contactless token is a Bluetooth token, which is often combined with a USB token, thus working in both a connected and a disconnected state. Bluetooth authentication works when closer than 32 feet (10 meters). If the Bluetooth is not available, the token must be inserted into a USB input device to function. In the USB mode of operation sign off required care for the token while mechanically coupled to the USB plug. The advantage with the Bluetooth mode of operation is the option of combining sign-off with a distance metrics.

Some types of Single sign-on (SSO) solutions, like enterprise single sign-on, use the token to store software that allows for seamless authentication and password filling. As the passwords are stored on the token, users need not remember their passwords and therefore can select more secure passwords, or have more secure passwords assigned. Additionally, a mobile computing device such as a smartphone or tablet computer can also be used as the authentication device. This provides secure two-factor authentication that does not require the user to carry around an additional physical device. Some vendors offer a mobile device authentication solution that uses a cryptographic key for user authentication. This provides a high level of security protection including protection from a Man-in-the-middle attack, which can occur from a rogue Hotspot (Wi-Fi).

Token designs meeting certain security standards are certified in the United States as compliant with FIPS (Federal Information Processing Standard) 140-2, a federal security standard. The standard provides four increasing, qualitative levels of security intended to cover a wide range of potential applications and environments. The security requirements cover areas related to the secure design and implementation of a cryptographic module. These areas include cryptographic module specification; cryptographic module ports and interfaces; roles, services, and authentication; finite state model; physical security; operational environment; cryptographic key management; electromagnetic interference/electromagnetic compatibility (EMI/EMC); self-tests; design assurance; and mitigation of other attacks. FIPS 140-2 defines four levels of security as follows:

Level 1

Security Level 1 provides the lowest level of security. Basic security requirements are specified for a cryptographic module (e.g., at least one Approved algorithm or Approved security function shall be used). No specific physical security mechanisms are required in a Security Level 1 cryptographic module beyond the basic requirement for production-grade components. An example of a Security Level 1 cryptographic module is a personal computer (PC) encryption board.

Level 2

Security Level 2 improves upon the physical security mechanisms of a Security Level 1 cryptographic module by requiring features that show evidence of tampering, including tamper-evident coatings or seals that must be broken to attain physical access to the plaintext cryptographic keys and critical security parameters (CSPs) within the module, or pick-resistant locks on covers or doors to protect against unauthorized physical access.

Level 3

In addition to the tamper-evident physical security mechanisms required at Security Level 2, Security Level 3 attempts to prevent the intruder from gaining access to CSPs held within the cryptographic module. Physical security mechanisms required at Security Level 3 are intended to have a high probability of detecting and responding to attempts at physical access, use or modification of the cryptographic module. The physical security mechanisms may include the use of strong enclosures and tamper detection/response circuitry that zeroes all plain text CSPs when the removable covers/doors of the cryptographic module are opened.

Level 4

Security Level 4 provides the highest level of security. At this security level, the physical security mechanisms provide a complete envelope of protection around the cryptographic module with the intent of detecting and responding to all unauthorized attempts at physical access. Penetration of the cryptographic module enclosure from any direction has a very high probability of being detected, resulting in the immediate zeroization of all plaintext CSPs.

It is to be appreciated that other housings and mounting schemes, e.g., circuit breaker mounted, are contemplated to be within the scope of the present disclosure.

It is to be appreciated that the various features shown and described are interchangeable, that is a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The invention claimed is:

1. An intelligent electronic device (IED) comprising:
   a housing;
   at least one sensor disposed in the housing and coupled to at least one power line of an electrical power distribution system and configured for measuring at least one power parameter of the at least one power line and generating at least one analog signal indicative of the at least one power parameter;
   at least one analog to digital converter disposed in the housing and coupled to the at least one sensor configured for receiving the at least one analog signal and converting the at least one analog signal to at least one digital signal;
   at least one storage medium including memory disposed in the housing and storing a software program for running an application; and at least one processing device disposed in the housing and configured to execute a plurality of instructions to implement a general purpose operating system for executing the application, wherein the software program is encrypted when loaded onto the at least one processing device; and wherein the at least one processing device decrypts the software program to enable the software program to execute to prevent copying the software from a remote location.

2. The IED of claim 1, wherein the software program is encrypted with a security key and the security key is stored in the housing for decrypting the software program.

3. The IED of claim 1, wherein a kernel is used to perform the decryption and execution of the software program.

4. The IED of claim 3, wherein the kernel is running on the at least one processor, loads the software program from the storage medium, and uses a security key to perform the decryption.

5. The IED of claim 1, wherein a challenge and response protocol is used to prevent direct querying of the software program.

6. The IED of claim 1, wherein the software program is digitally keyed.

7. The IED of claim 6, wherein the software program includes a binary, and a certificate is placed in the binary which must be verified before the software can run.

8. The IED of claim 6, wherein the memory includes a manifest of software signatures, and the at least one processor compares a signature of the software program against the manifest before allowing the software program to run.

9. The IED of claim 1, wherein the decryption is performed on a secure layer.

10. The IED of claim 1, wherein the at least one processor includes at least a first processor and a second processor, wherein the second processor loads the software program from the storage medium, decrypts the software program, and returns decrypted data to the first processor.

11. An intelligent electronic device (IED) comprising:
a housing;
at least one sensor disposed in the housing and coupled to at least one power line of an electrical power distribution system and configured for measuring at least one power parameter of the at least one power line and generating at least one analog signal indicative of the at least one power parameter;
at least one analog to digital converter disposed in the housing and coupled to the at least one sensor configured for receiving the at least one analog signal and converting the at least one analog signal to at least one digital signal;
at least one storage medium including memory disposed in the housing and storing a software program for running a web server application; and
at least one processing device disposed in the housing and configured to execute a plurality of instructions to implement a general purpose operating system for executing the application, the at least one processing device including at least a first processor and a second processor,
wherein the software program is encrypted when loaded onto the second processor; and
wherein the second processor decrypts the software program to enable the software program to execute to prevent copying the software from a remote location.

12. The IED of claim 11, wherein the software program is encrypted with a security key and the security key is stored in the housing for decrypting the software program.

13. The IED of claim 11, wherein a kernel is used to perform the decryption and execution of the software program.

14. The IED of claim 13, wherein the kernel is running on the second processor, loads the software program from the storage medium, and uses a security key to perform the decryption.

15. The IED of claim 11, wherein a challenge and response protocol is used to prevent direct querying of the software program.

16. The IED of claim 11, wherein the software program is digitally keyed.

17. The IED of claim 16, wherein the software program includes a binary, and a certificate is placed in the binary which must be verified before the software can run.

18. The IED of claim 16, wherein the memory includes a manifest of software signatures, and the at least one processor compares a signature of the software program against the manifest before allowing the software program to run.

* * * * *